United States Patent
Cillis et al.

(10) Patent No.: US 9,703,660 B2
(45) Date of Patent: Jul. 11, 2017

(54) TESTING A VIRTUALIZED NETWORK FUNCTION IN A NETWORK

(71) Applicants: International Business Machines Corporation, Armonk, NY (US); ng4T GmbH, Berlin (DE)

(72) Inventors: Canio Cillis, Berlin (DE); Jochen Kappel, Gross-Gerau (DE); Daniel J. Martin, Pawling, NY (US); Martin McDonald, Berlin (DE)

(73) Assignee: International Business Machines Corporation, Armonk, NY (US)

( * ) Notice: Subject to any disclaimer, the term of this patent is extended or adjusted under 35 U.S.C. 154(b) by 115 days.

(21) Appl. No.: 14/625,656

(22) Filed: Feb. 19, 2015

(65) Prior Publication Data
US 2015/0234725 A1 Aug. 20, 2015

(30) Foreign Application Priority Data
Feb. 20, 2014 (GB) .................................. 1403010.0

(51) Int. Cl.
*G06F 11/36* (2006.01)
*G06F 11/263* (2006.01)
(Continued)

(52) U.S. Cl.
CPC ............ *G06F 11/263* (2013.01); *H04L 43/50* (2013.01); *G06F 11/3672* (2013.01); *G06F 2009/45591* (2013.01); *H04W 24/00* (2013.01)

(58) Field of Classification Search
CPC .. G06F 11/3668; G06F 11/3672; G06F 21/53; G06F 9/455; G06F 9/45533;
(Continued)

(56) References Cited

U.S. PATENT DOCUMENTS 7,760,656 B1 * 7/2010 Yuan ................... H04L 12/2697
370/242
9,384,028 B1 * 7/2016 Felstaine ............. G06F 9/45533
(Continued)

OTHER PUBLICATIONS

Solutions & Demos, Updated Feb. 7, 2014, Mobile World Congress 2014—Sales Kit Wiki, 5 pages.
(Continued)

*Primary Examiner* — Joseph Schell
(74) *Attorney, Agent, or Firm* — Schmeiser, Olsen & Watts, LLP; John Pivnichny (57) ABSTRACT

A method and system for testing a Virtualized Network Function (VNF) in a network. Metadata including test parameters pertaining to a network environment specific to the VNF is retrieved. At least one Virtualized Network Tester (VNT) for testing the VNF is created and stored in the network. The metadata is mapped to a test list to define a test suite of test cases based on the test parameters in the metadata. The VNF is tested by the at least one VNT according to the test suite to enable the at least one VNT to emulate the network environment specific to the VNF. The VNF is disconnected from the network and from virtual networks during the testing. If the testing is successful, the VNF is attached to the network and to virtual networks to enable the VNF to be deployed in the network. If the testing is unsuccessful, the method ends.

20 Claims, 7 Drawing Sheets (51) Int. Cl.
*H04L 12/26* (2006.01)
*G06F 9/455* (2006.01)
*H04W 24/00* (2009.01)

(58) Field of Classification Search
CPC ............. G06F 9/45558; G06F 9/45591; G06F 2009/45591; H04L 12/4641
See application file for complete search history.

(56) References Cited

U.S. PATENT DOCUMENTS

2009/0300605 A1* 12/2009 Edwards ............... G06F 9/5077
                                                   718/1
2015/0180730 A1*  6/2015 Felstaine ............. H04L 41/022
                                                  709/225

OTHER PUBLICATIONS

Network Functions Virtualisation (NFV); Architectural Framework, Group Specification, ETSI GS NFV 002 V1.1.1 (Oct. 2013), 21 pages.

Network Functions Virtualisation (NFV), Issue 1, Network Operator Perspectives on Industry Progress, Publication Date Oct. 15-17, 2013 at the "SDN and OpenFLow World Congress", Frankfurt-Germany, 16 pages.

Network Functions Virtualisation, Issue 1, An Introduction, Benefits, Enablers, Challenges & Call for Action, Publication Date Oct. 22-24, 2012 at the "SDN and OpenFLow World Congress", Darmstadt-Germany, 16 pages.

Kuzniar et al., Often Testing OpenFlow Networks, 2012 European Workshop on Software Defined Networking, CPS, 978-7695-4870-8/12. copyright 2012 IEEE DOI 10.1109 EWSDN.2012.21, pp. 54-60.

Tsai et al., Design and Develop on OpenFlow Testbed within Virtualized Architecture, copyright 2013 IEICE, 3 pages.

Riggio et al., EmPOWER: A Testbed for Network Function Virtualization Research and Experimentation, 2013 IEEE Software Defined Networks for Future Networks and Services (SDN4FNS), Nov. 2013, 5 pages.

* cited by examiner

| Parameter | Description |
|---|---|
| <VNF app type> | VNF application type (e.g. vEPC, Firewall,...) |
| <test purpose> | reason for testing (initial deployment, update VNF, update service, load test) |
| <VNF app interface list> | all external interfaces of the VNF application that need to be connected to the VNT |
| <VNF app vm name> | VM that has an external interface |
| <VNF app interface name> | descriptive name of the interface |
| <attached vnet name> | name of the attached vNET |
| <Test VNF name> | descriptive name of the VNT |
| <Test VNF id> | UUID of the VNT |
| <Test VNF interface list> | the test VNF interfaces that need to connect to the VNF |
| <Test VNF vm name> | |
| <Test VNF interface name> | |
| <Test VNF test list> | Test list name referencing the test cases |

TESTING A VIRTUALIZED NETWORK FUNCTION IN A NETWORK

TECHNICAL FIELD

The present invention relates in general to data processing systems, and in particular, to a method for testing a Virtualized Network Function in a network.

BACKGROUND

Service provider networks contain a number of network components including base-stations, radio network controllers, Mobility Management Entity, Serving Gateway, Packet Data Network Gateway, session boarder controllers, Voice over IP servers, IMS (IP Multimedia Subsystems), etc. Upon such a network infrastructure, services like Video Optimization, Web Caching etc. are widely deployed. These network components (nodes) and network services are individually tested in lab environments for a number of aspects such as protocol compliance, performance, and load capacity, and are also tested during the initial phases of a network rollout with these components. However, factors like network growth and the dynamics in user traffic or impact from new devices cause network conditions to change rapidly after deployment, meaning that there is a need to understand the effects of these changes on the entire network topology.

Traditionally, two approaches are followed to tackle such network changes: First, "reactive" fixes to network topologies or network policies after some problematic event occurs, which is often too late. These events or conditions are often detected with large and expensive Network Monitoring Systems. Second, drive tests and testing with real mobile devices, which is limited in load, coverage, functionality and prohibitively expensive.

Additionally, these methods make it difficult to realistically simulate all network conditions in an accurate way. Consequently, the current state-of-the-art does not, in reality, allow such live network tests after deployment.

In the future, service provider network testing becomes even more imperative, since the trend is to provide communication functionality as software as an on-demand service like in networks, enabled for Network Functions Virtualization (NFV) (which can be combined with Software Defined Networking (SDN)). SDN describes possibilities to change the routing of packets in an NFV enabled network, but that routing may not necessarily be done via software, but can also be done by hardware routers. Following any NFV enabled network or the combined SDN and NFV network are named as "SDN/NFV enabled network" (SDN/NFV means SDN and/or NFV).

These new network architectures introduce requirements on dynamic deployment and runtime management of both the virtualized network elements/functions and network services based on the virtualized network infrastructure connecting them. These "networks in a cloud" introduce new needs for testing as the technologies enable now to roll-out new network functions very rapidly on demand. Thus the complexity of networks as well as the sheer number of network functions to be managed increases and changes greatly. The ability to test new virtual function deployments on the fly needs to adapt to this large growth.

BRIEF SUMMARY

A method, a data processing system that implements the method, and a computer program product that implements the method, for testing a Virtualized Network Function (VNF) in a network. The method comprises the following steps. One or more processors of a data processing system retrieve metadata comprising test parameters pertaining to a network environment specific to the VNF stored in the network. The one or more processors (i) create at least one Virtualized Network Tester (VNT) for testing the VNF and (ii) store the at least one VNT in the network. In response to the creating the at least one VNT, the one or more processors map the metadata to a test list to define a test suite of test cases in the test list, wherein the test cases are based on the test parameters in the metadata. The one or more processors test the VNF by the at least one VNT in accordance with the test suite to enable the at least one VNT to emulate the external interfaces and the network environment specific to the VNF, the VNF being disconnected from the external interfaces and the network. The one or more processors determine that the testing is successful and in response, attach the VNF to the network and to each virtual network of the plurality of virtual networks to enable the VNF to be deployed in the network and connect the external interfaces.

DETAILED DESCRIPTION

In the drawings, like elements are referred to with equal reference numerals. The drawings are merely schematic representations, not intended to portray specific parameters of the invention. Moreover, the drawings are intended to depict only typical embodiments of the invention and therefore should not be considered as limiting the scope of the invention.

The present invention provides a time and cost efficient method for testing a Virtualized Network Function (VNF) in a Software Defined Networking (SDN)/Network Functions Virtualization (NFV) enabled network.

A Virtualized Network Function is defined as a network function that runs in one or more virtual machines on top of a networking infrastructure that may include routers, switches, storage, servers, cloud computing systems, etc.

Network Functions Virtualization is a network architecture that includes Virtualized Network Functions that may be combined to create networking communication services.

Software Defined Networking provides software programmatic interfaces into network equipment and/or decouples a network control plane (that selects a destination to which network traffic is to be sent) from a network forwarding plane (that forwards the network traffic to the selected destination).

According to a first aspect of the invention a method is provided for testing a Virtualized Network Function in a Network Functions Virtualization and/or Software Defined Networking (SDN/NFV) enabled network, comprising the steps (i) creating a Virtualized Network Function for deployment in the network, (ii) retrieving metadata from a configuration of the Virtualized Network Function, representing a network environment specific to the Virtualized Network Function, particularly its deployment, (iii) creating at least one Virtualized Network Tester in the network for testing the Virtualized Network Function, (iv) mapping the metadata to a test list of the Virtualized Network Tester, (v) performing a test suite according to the test list of the Virtualized Network Tester on the Virtualized Network Function in a network environment specific for the Virtualized Network Function.

Advantageously, a Virtualized Network Function (VNF) is deployed and managed together with a Virtualized Network Tester (VNT), thus enabling automatic configuration of tests including subsequent execution of tests on the fly of on-demand deployed Virtualized Network Functions or services and other changes/updates in the network in virtualized networks.

In more details, a method is provided for testing on demand virtualized units (VNFs) using virtualized testers (VNTs) in the form of virtual machines located together with the virtualized units under test (virtualized network element/function or network service). By virtue of being inside the service provider network, these VNTs will additionally have access to various measurements including user traffic, channel and schedule information and can pro-actively track changing network conditions and traffic patterns over time in order to build models of network phenomena. The VNTs may use varying degrees of network information to initiate various tests levels (sanity tests, integration tests, . . . ), and can also be controlled from a single network test center, which may input various parameters to each VNT, for instance the number of client devices to simulate, traffic patterns etc. Additionally technologies like virtual networks and routing policies allow for a high degree of automation to deploy and execute tests and, based on the test results, take appropriate actions (like reconfiguring the VNT interface emulation and switching the new VNF into a production traffic path).

The location of the VNT inside the network within the compute environment of the VNF is a major advantage during testing: the VNT can have access to the history of traffic patterns specific to the VNF and can generate very realistic traffic patterns. As well before going live for production the VNT can emulate the external interfaces and check the correctness of the VNF deployment within the specific environment before the VNF will be set to an operational state.

Further, by being inside the network, the VNT can know the current load on the VNF. This has multiple advantages. First, this enables better scheduling of live network tests so that interference to real traffic is minimized. Second, by being managed by a Network Functions Virtualization Management And Orchestration (NFV-MANO) system together with the VNF, free computing and network resources can be used for test purposes. Third, by knowing current traffic patterns and loads, the VNT can generate appropriate traffic patterns to complement real traffic. For example, if a test wishes to simulate peak demand conditions in a base-station, (with e.g., 20 video users), and it knows that there are currently 5 real users active, each with very good channel conditions, the VNT can complement this reality by simulating 15 extra users with below average channel conditions to simulate a realistic peak load.

Locating VNTs inside the network allows for isolating various network components in the test, as desired. For example, one could isolate a new virtual evolved packet core (vEPC) or the backhaul for testing or test only the air interface.

The following example depicts the advantages when a service provider needs to deploy a virtualized evolved packet core (vEPC) or when deploying virtualized network services based on a running vEPC. In virtualized environments the service provider may ramp up business models based on 'customized' infrastructures, in this case a customized vEPC. One vEPC instance could be deployed and represent the currently known consumer mobile packet core. Based on the 'network in a cloud' architecture and specific SLA requirements from enterprise customers, the service provider could decide to separate a specific portion of the network traffic from the consumer traffic and instantiate a new vEPC instance operating exclusively with the Machine to Machine (M2M) traffic of a particular enterprise. When deploying this new vEPC it would be a great advantage to deploy and manage the test and qualification entities from a central operating and orchestration system together with the new virtual network elements or new virtual service function, thus enabling automatic configuration and testing and on the fly testing of newly deployed network element and services or other changes in the network.

Advantageously, the method according to the invention is based on a data processing system running a Network Functions Virtualization Management And Orchestration (NFV-MANO) system providing the tools to define and execute workflows like creating VNFs and VNTs, running a post-installation configuration on VNFs and VNTs, starting VNT test suites, acting on VNT test results.

According to the described method on NFV-MANO level a workflow is executed to create a new VNF in the network. The workflow creates the VNF on the compute node and stores the VNF profile/provisioning parameters. Upon a VNF test flag, stored in the metadata model, the workflow identifies if the VNF needs to be tested before it is brought into the production system. In this case the NFV-MANO workflow creates the suited VNT (profiled with the VNF provisioning parameters) and specifies the test category to be performed (e.g., sanity test, quick check, live testing, load testing, etc). Depending on the test category, the test suite is started and the VNT delivers test results back to the NFV-MANO. Upon manual or automatic evaluation of the test results, the VNF may be set to 'operational'.

In one embodiment, the Virtualized Network Tester may emulate the environment of the Virtualized Network Function in the network based on the test list. Thus it is possible to test the VNF under real environmental conditions of the surrounding network.

For joining a productive state of the network, the Virtualized Network Function may be favorably set to an operational state after successful completion of the test suite by connecting interfaces in the network and/or updating a configuration management system within an orchestration system.

Advantageously an orchestration system of the network may automatically create at least one Virtualized Network Tester if a Virtualized Network Function is deployed which has not been tested or needs to be tested due to any updates of the environment or the VNF itself. By this way a complete coverage of the NFV's deployed in a network system can be achieved under time and cost efficient conditions.

Concerning automated testing, by integration of the VNT into the orchestration system NFV-MANO (direct integration or indirect integration via automated information exchange), tests can be activated automatically when deploying the VNF into the compute node and the virtualized network, since the network orchestrator can deploy and trigger the needed VNT and test suite execution. This is in particular important since in SDN/NFV environments work loads in the service provider networks may change dynamically on demand (according to predefined policies or load conditions, . . . ).

Therefore the Virtualized Network Tester may advantageously be integrated into the orchestration system for automatically activating testing if the Virtualized Network Function is deployed or updated into a compute node and/or the network.

Favorably, a Virtualized Network Tester may be controlled by the orchestration system for reutilization of network resources. Thus a workflow may be executed to reconfigure the network or reutilize resources in the network in order to cover testing requirements as quickly and efficiently as possible.

In an advantageous embodiment mapping of the VNF metadata as test parameters to the test list may be performed upon creation of the Virtualized Network Tester. Thus it is possible to run the VNT test suites in a time efficient way under realistic environmental conditions of the network.

Favorably the Virtualized Network Function may be tested by the Virtualized Network Tester in an isolated environment with the Virtualized Network Tester emulating a network environment (e.g. interfaces) or part of a network environment of the Virtualized Network Function. Under such conditions it is possible to perform the tests in a realistic way without disturbing a running production network.

In a favorable embodiment Virtualized Network Function interfaces may be integrated stepwise VNF interface by VNF interface with a production network. The NFV may be first isolated on many interfaces and when one subset of the interfaces is verified and safe to deploy, then this interfaces may be switched into the productive network. Testing may continue step by step until all interface are switched to the production or operational network. This way there are tests executed where the NFV is already partially integrated into the production network and the tests become more and more realistic.

Advantageously the VNF metadata may be mapped to the test list of the Virtualized Network Tester using at least one template. Templates are frequently used for mapping data in a well defined and safe way to another system. Thus it may be advantageous that the metadata used for testing a VNF may be organized in templates, too, in order to cover a necessary system safety level.

In an advantageous embodiment the Virtualized Network Function may be parameterized with the metadata of the test list used by the Virtualized Network Tester. Thus the VNF may run under well defined conditions according to the environment the VNF is deployed for.

Favorably a previously instantiated or previously used Virtualized Network Tester may be reused with new or changed test lists or parameters from the metadata. By this way a very efficient and immediate response to deployed Virtualized Network Functions is advantageously achievable.

According to a further advantageous aspect of the invention a data processing program for execution in a data processing system is provided comprising an implementation of an instruction set for performing a method as described above when the data processing program is run on a computer.

Further a favorable computer program product is provided comprising a computer usable medium including a computer readable program, wherein the computer readable program when executed on a computer causes the computer to perform a method for testing a Virtualized Network Function in a Network function Virtualization and/or Software Defined Networking enabled network, comprising the steps (i) creating a Virtualized Network Function for deployment in the network, (ii) retrieving metadata from a configuration of the Virtualized Network Function, representing a network environment specific to the Virtualized Network Function, (iii) creating at least one Virtualized Network Tester in the network for testing the Virtualized Network Function, (iv) mapping the metadata to a test list of the Virtualized Network Tester, (v) performing a test suite according to the test list of the Virtualized Network Tester on the Virtualized Network Function in a network environment specific to the Virtualized Network Function.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire connection, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to block diagrams of methods, apparatus (systems) and computer program products according to embodiments of the invention. It will be understood that each block of the flowchart illustrations and/or block diagrams, and combinations of blocks in the block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the block diagram block or blocks.

Due to a further aspect of the invention, a data processing system for execution of a data processing program is provided, comprising software code portions for performing a method described above.

Figure 1:
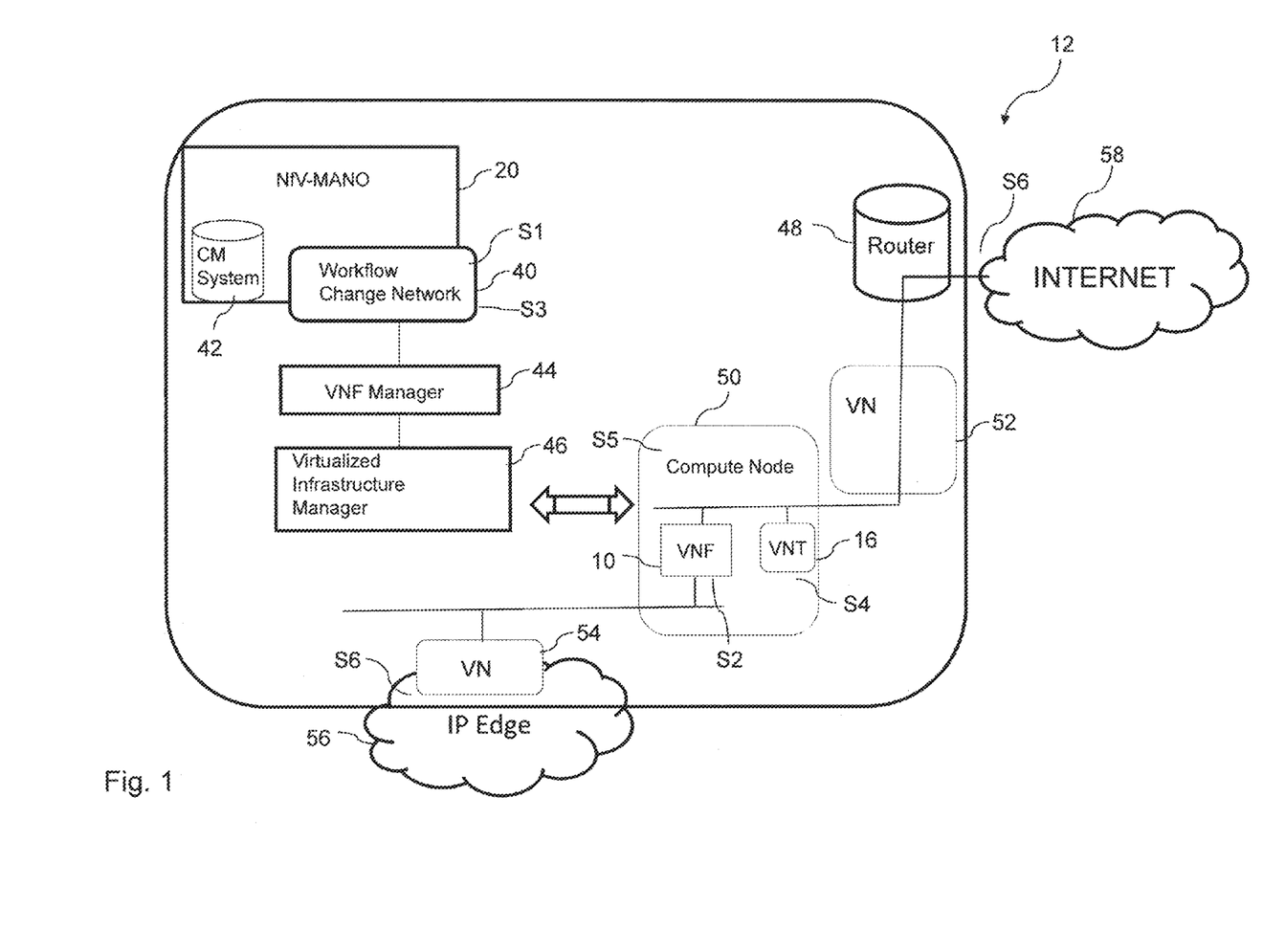
FIG. 1 is an overview of a deployment process for a Virtualized Network Function including on the fly testing and validation according to the invention.

FIG. 1 gives an overview of a deployment process for a Virtualized Network Function 10 including on the fly testing and validation according to the invention. FIG. 1 explains the cooperation of the different units in an SDN/NFV enabled network 12. Definitions concerning terms of wording and building block definition may be found in the following website link: "http://" concatenated with "www.etsi.org/deliver/etsi_gs/NFV/001_099/002/01.01.01_60/gs_NFV002v010101p.pdf". A Network Functions Virtualization Management And Orchestration system (NFV-MANO) 20 administrates the system running a business process workflow 40 as well as a configuration management system 42; the NFV-MANO 20 is in connection with a VNF manager 44 connected to a virtualized infrastructure manager 46. VNFs 10 and VNTs 16 are running on a compute node 50, which may be connected on the right side to the virtual network 52 usually hosting for service provider value added services and interfacing the internet via a gateway router 48. On the left side the compute node 50 may be connected to a virtual network 54, which is coupled to an IP edge 56, featuring service provider network interfaces. The virtualized infrastructure manager 46 cooperates with the compute node 50.

For deploying a Virtualized Network Function 10, in step S1 on NFV-MANO level 20, a workflow 40 is executed to reconfigure the virtual network; e.g. create, change, remove a new VNF 10 or service or reutilize resources in the service provider network 12. The operator or on demand any new network condition may trigger (via the OSS system) the execution of a workflow to reconfigure the virtual network, for example to spin up a dedicated VNF 10 in the production network. The image and its configuration are stored in a CM system 42. In step S2 the workflow reconfigures the virtual network, for example, creates the VNF 10 on the compute node 50 and stores the VNF profile/provisioning parameters. The VNF manager 44 changes on IT level the requested network resources, like virtual network, virtual machine and network policies to host and run the VNF 10.

In step S3, upon a VNF test flag, stored in the metadata model, the workflow identifies, if the network change needs to be tested before it is brought into the production system. When modeling the workflow business objects to each of the preconfigured images, the test flag, and the name of the test suite are stored in the CM system 42, whereas together with the VNF provisioning parameters the image is stored in the CM system 42. In step S4, in case the test flag is set, the workflow manages the VNT 16, i.e. creates or updates the VNT 16 with the required VNF provisioning parameters and specifies the test category to be performed, like sanity test, quick check, live testing, load testing, etc. In step S5, depending on the test category, the VNT 16 is started, performs the related test suite and delivers back to the workflow the test results. In step S6, upon manual or automatic evaluation of the test results, the VNF 10 will be set to 'operational' and connected to the left virtual network 54 and the right virtual network 52, which usually interface directly or indirectly to external IT systems and the new VNF 10 instance will be connected into the production network.

Figure 2:
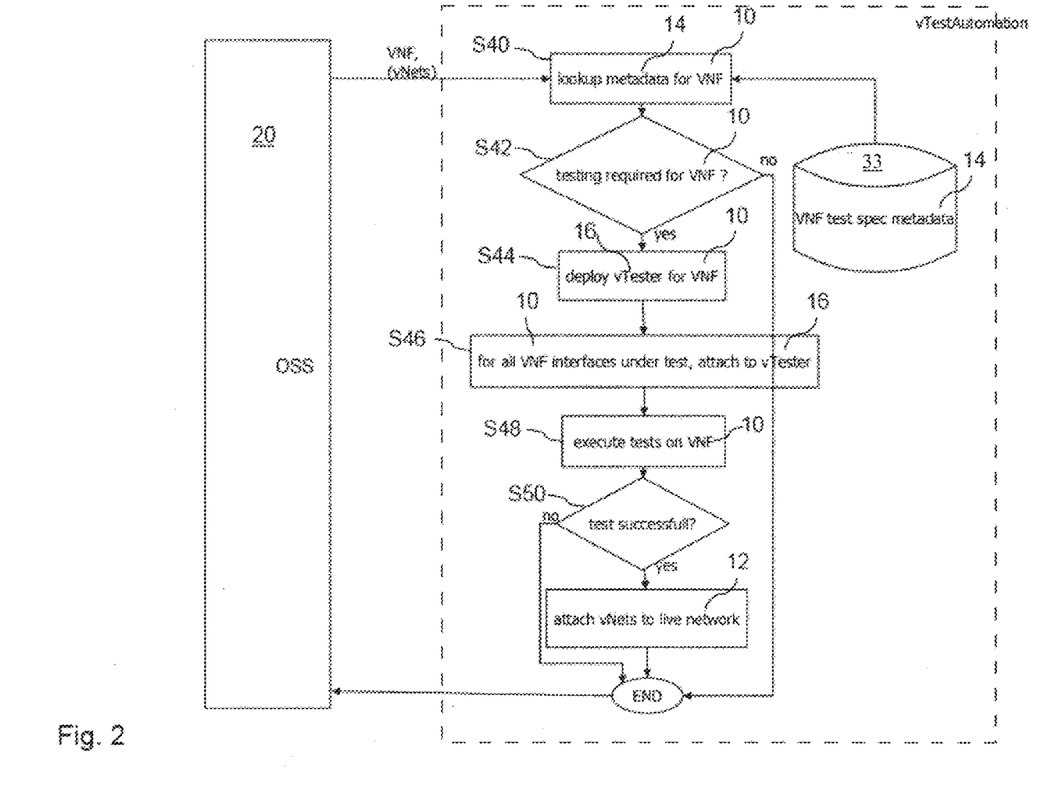
FIG. 2 is a workflow for performing an automated test for a Virtualized Network Function according to the invention.

In FIG. 2, a workflow 40 for an automated test for a Virtualized Network Function 10 according to the invention is shown. In step S40 metadata 14 for a VNF 10, running in a virtual network vNet, are to be looked up, where the input for the metadata 14 is provided by a CM system 33 typically configuration parameters may be released from the network planning department. Then in step S42 it is evaluated if testing is required for the VNF 10. If not, the whole process comes to an end. If yes, a VNT instance 16 is deployed in step S44, where in the next step S46 all VNF interfaces are attached to this VNT instance 16. Next, in step S48 the required test suites are executed on the VNFs 10. A query, S50, controls whether the test has been successful. If not, the process ends. If yes, the VNF 10 is attached to the service provider network 12 as planned.

Figure 3:
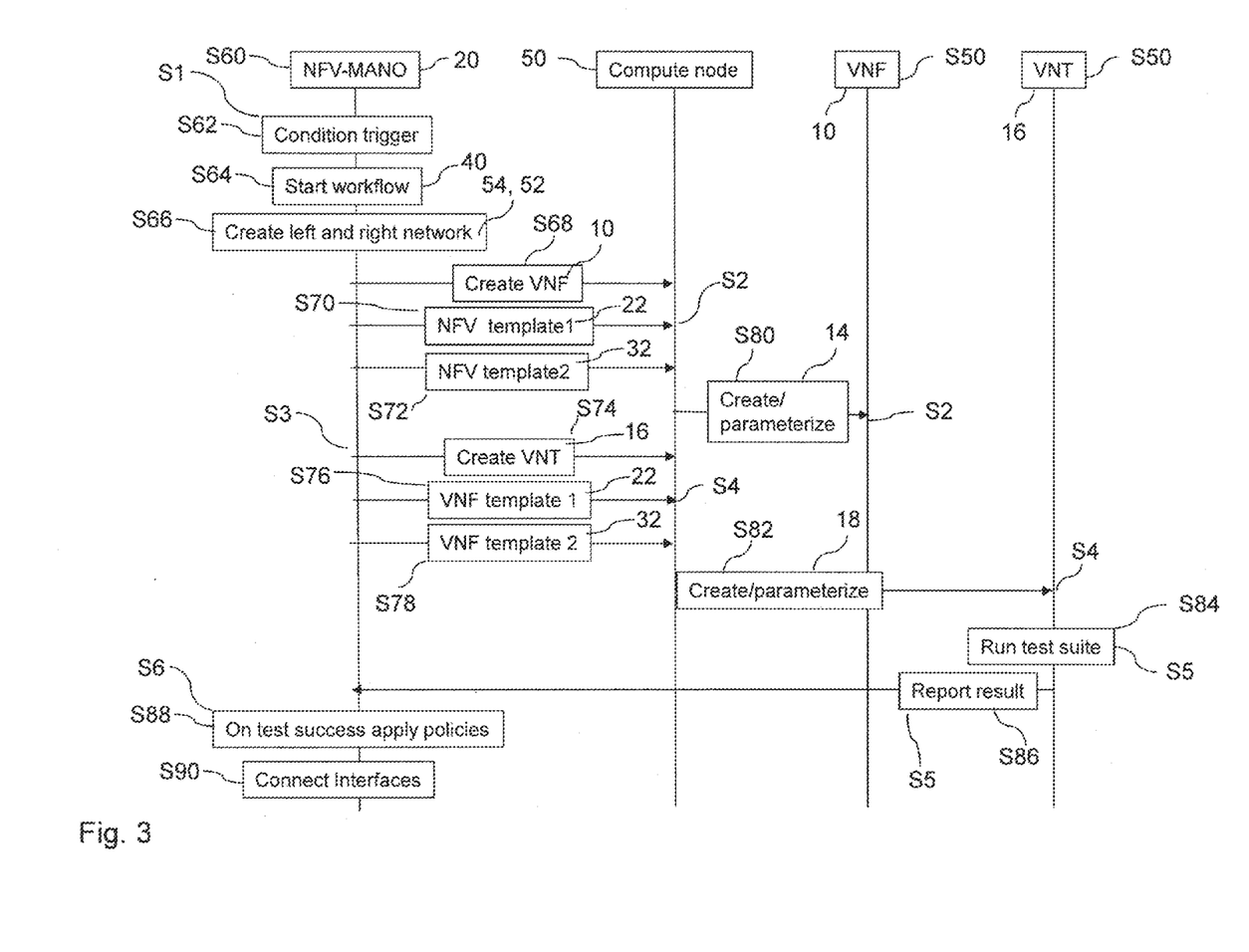
FIG. 3 is a workflow for testing a Virtualized Network Function according to the invention.

FIG. 3 shows a workflow for testing a Virtualized Network Function 10 according to the invention. In FIG. 3 the method for testing a Virtualized Network Function 10 in a SDN/NFV enabled network 12 based on Network Functions Virtualization, comprising the steps (i) creating a Virtualized Network Function 10 for deployment in the network 12, (ii) retrieving metadata 14 from a configuration of the Virtualized Network Function 10, said metadata representing a network environment specific to the Virtualized Network Function 10, (iii) creating at least one Virtualized Network Tester 16 in the network 12 for testing the Virtualized Network Function 10, (iv) mapping the metadata 14 to a test list 18 of the Virtualized Network Tester 16, (v) performing a test suite according to the test list 18 of the Virtualized Network Tester 16 on the Virtualized Network Function 10 in a network environment specific to the Virtualized Network Function 10, is explained in more details. The Virtualized Network Tester 16 is emulating the environment of the Virtualized Network Function 10 in the network 12 based on the test list 18. The orchestration system (NFV-MANO) 20 of the network 12 is automatically creating at least one Virtualized Network Tester 16 if a Virtualized Network Function 10 is deployed which has not been tested. Mapping of the metadata 14 to the test list 18 is performed upon creation of the Virtualized Network Tester 16. The Virtualized Network Function 10 is tested by the Virtualized Network Tester 16 in an isolated environment with the Virtualized Network Tester 16 emulating a network environment of the Virtualized Network Function 10. The metadata 14 are mapped to the test list 18 of the Virtualized Network Tester 16 using at least one template 22, 32. The Virtualized Network Function 10 is parameterized with the metadata 14 of the test list 18 used by the Virtualized Network Tester 16.

In detail, referring to the steps S1 to S6 already explained in FIG. 1, for deploying a Virtualized Network Function 10, in step S1 on NFV-MANO level 20, 40, step S60, a workflow is executed to reconfigure the virtual network e.g. create, change, remove a new VNF 10 or service or reutilize resources in the network 12. The operator or on demand any new network condition may trigger step S62, via an OSS the execution of a workflow to reconfigure the virtual network, step S64, for example to spin up a dedicated VNF 10. The image and its configuration are stored in a CM system 42. Step S66 creates a left virtual network 54 and a right virtual network 52. In step S2 the workflow reconfigures the virtual network, for example, creates the VNF 10 in compute node 50, step S68, and stores the VNF profile/provisioning parameters in the templates 22, 32 to a test list 18 not shown, steps S70 and S72. The VNF manager 44 changes on IT level the requested network resources, like virtual network, virtual machine and network policies to run the VNF 10.

In step S3, upon a VNF test flag, stored in the metadata model, the workflow identifies, if the network change needs to be tested before it is brought into the production system. When modeling the business objects to each of the preconfigured images the test flag and the name of the test suite is stored together with the VNF provisioning parameters in the CM system 42. In step S4, in case the test flag is set, the workflow manages the suited VNT 16, i.e. creates or updates the VNT 16, step S74, with the VNF provisioning parameters, steps S76 and S78, and specifies the test category to be performed, like sanity test, quick check, live testing, load testing. Step S80 creates or parameterizes the metadata 14. In step S5, depending on the test category, the VNT 16 is started, step S82 creates or parameterizes the test suite in the test list 18, step S84 performs the related test suite in test list 18, and step S86 delivers back to the workflow the test results. In step S6, upon manual or automatic evaluation of the test results the VNF 10 will be set to 'operational', step S88, and connected to the left virtual network 54 and the right virtual network 52 in step S90, which usually represents the interface to external IT systems, and the new VNF 10 instance will be connected into the production network.

Figure 4:
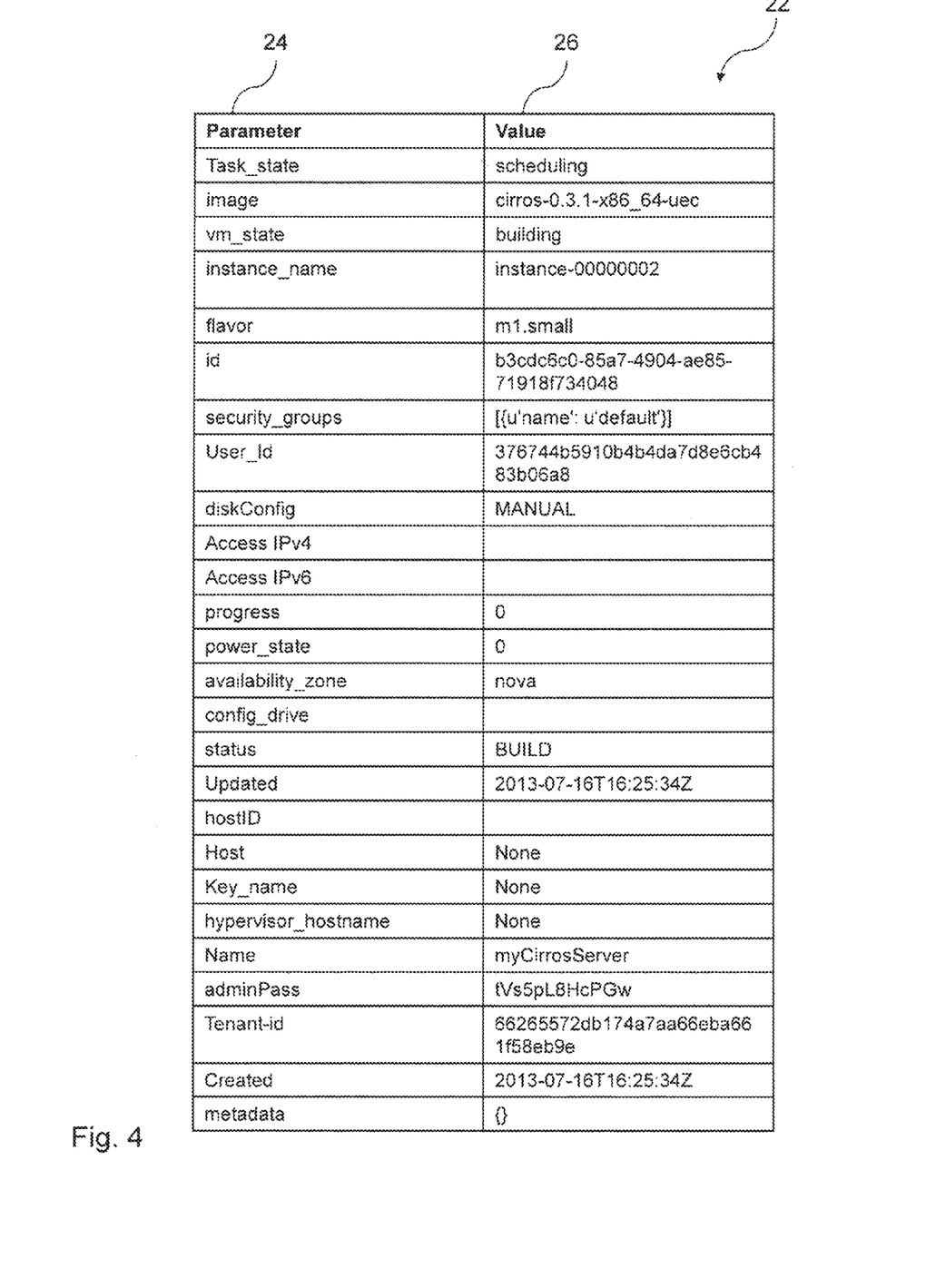
FIG. 4 is a typical template for the deployment of a Virtualized Network Function according to the invention.

FIG. 4 is showing a typical template for the deployment of a Virtualized Network Function 10. The left column 24 lists a number of parameters relevant for an example embodiment of a VNF 10, which does not claim to be exhaustive. The right column 26 is filled with example values for the listed parameters to give an impression how they may look like.

Figure 5:
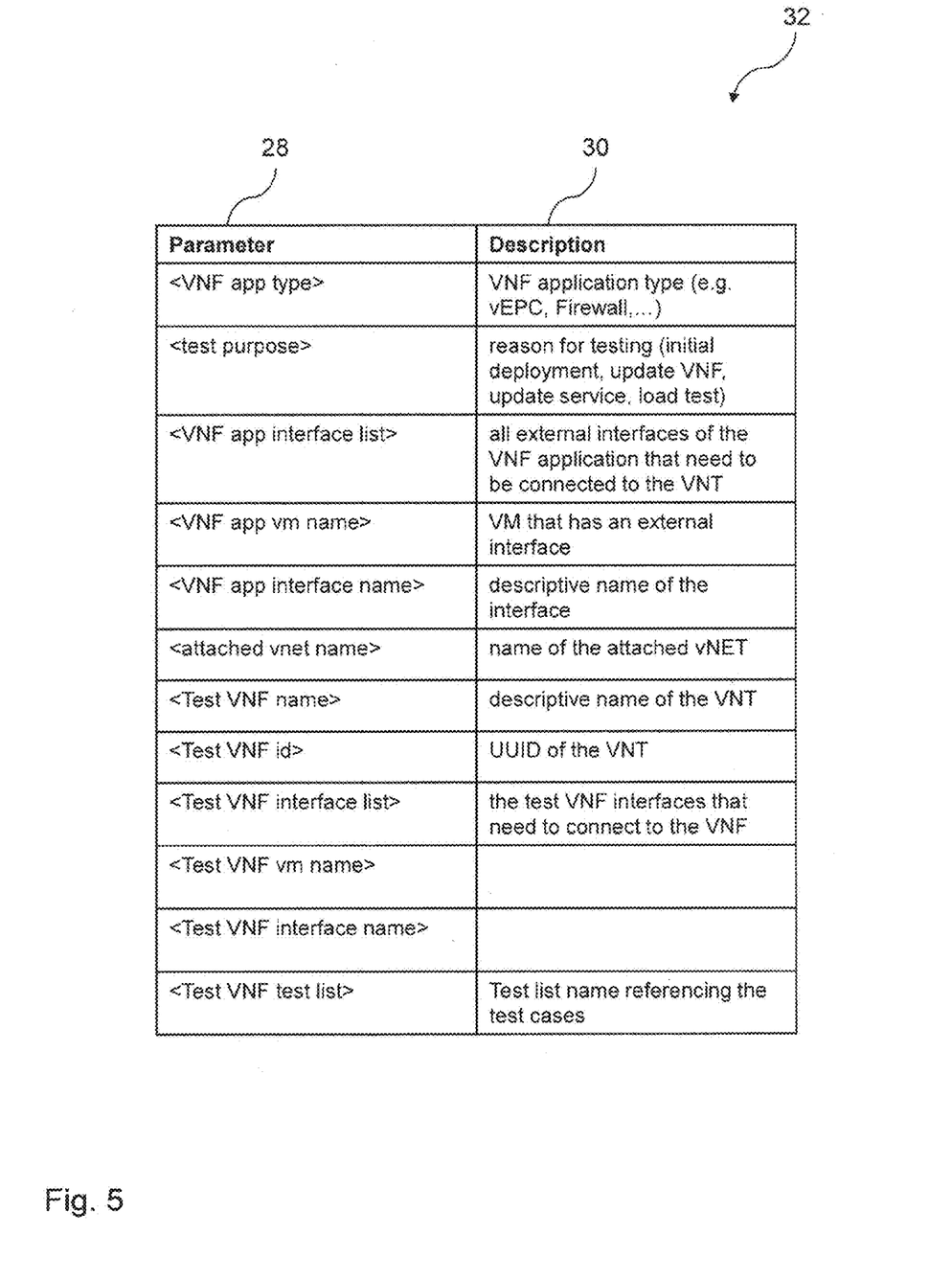
FIG. 5 is a template for automatic testing of a Virtualized Network Function according to the invention.

In FIG. 5 a template for automatic testing of a Virtualized Network Function 10 according to the invention is shown. There a number of parameters are listed in column 28, which may be relevant to the automation of testing a VNF 10 on a network 12. In the right column 30 the meaning of the parameters is described.

Figure 6:
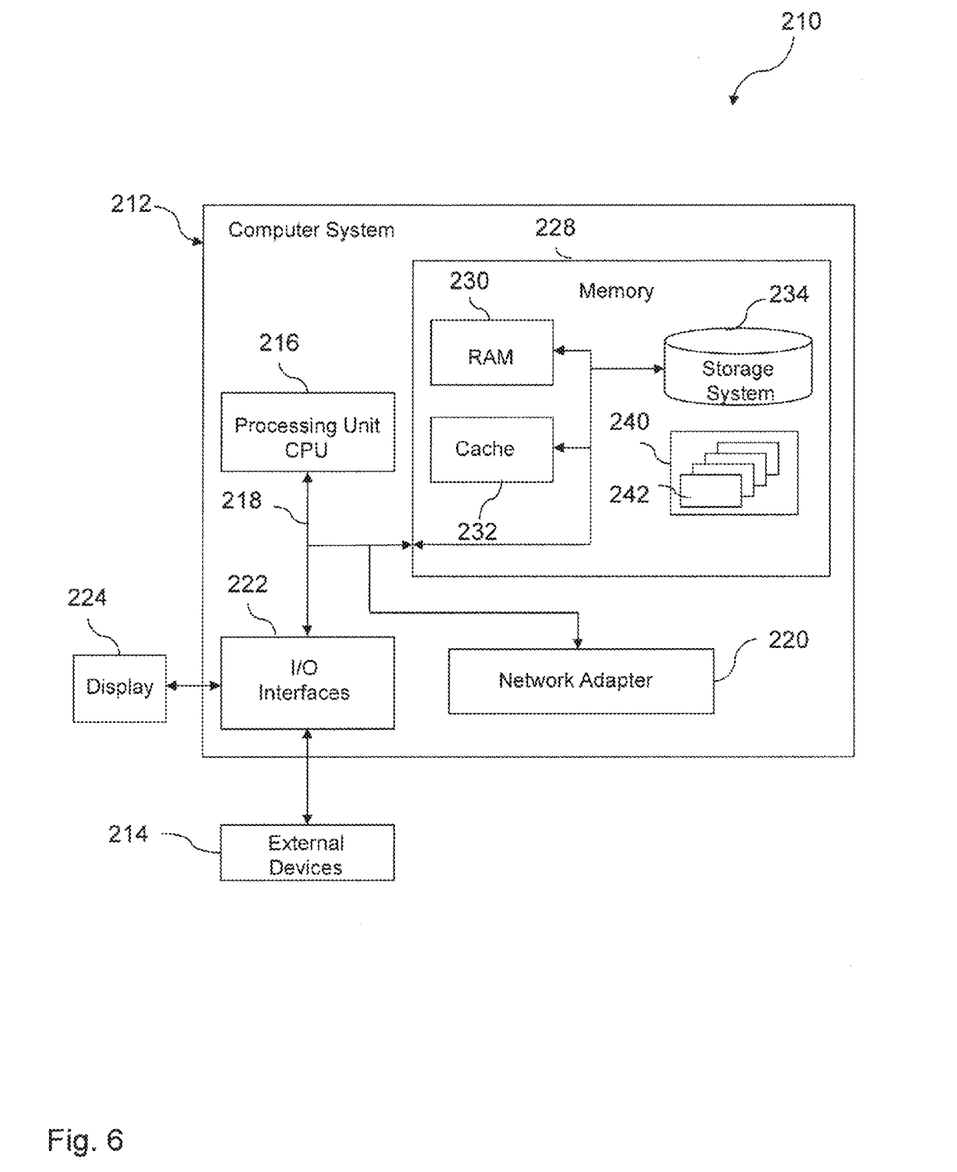
FIG. 6 is an example embodiment of a data processing system for carrying out the method for testing a Virtualized Network Function according to the invention.

Referring now to FIG. 6, a schematic of an example of a data processing system 210 is shown. Data processing system 210 is only one example of a suitable data processing system and is not intended to suggest any limitation as to the scope of use or functionality of embodiments of the invention described herein. Regardless, data processing system 210 is capable of being implemented and/or performing any of the functionality set forth herein above.

The data processing system 210 is capable of running a computer program product comprising a computer usable medium including a computer readable program, wherein the computer readable program when executed on a computer system 212 causes the computer system 212 to perform a method for testing a Virtualized Network Function 10 in an SDN/NFV enabled network 12, comprising the steps (i) creating a Virtualized Network Function 10 for deployment in the network 12, (ii) retrieving metadata 14 from a configuration of the Virtualized Network Function 10, representing a network environment specific to the Virtualized Network Function 10, (iii) creating at least one Virtualized Network Tester 16 in the network 12 for testing the Virtualized Network Function 10, (iv) mapping the metadata 14 to a test list 18 of the Virtualized Network Tester 16, (v) performing a test suite according to the test list 18 of the Virtualized Network Tester 16 on the Virtualized Network Function 10 in a network environment specific to the Virtualized Network Function 10.

In data processing system 210 there is a computer system/server 212, which is operational with numerous other general purpose or special purpose computing system environments or configurations. Examples of well-known computing systems, environments, and/or configurations that may be suitable for use with computer system/server 212 include, but are not limited to, micro-controllers, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 212 may be described in the general context of computer system executable instructions, such as program modules, being executed by a computer system. Generally, program modules may include routines, programs, objects, components, logic, data structures, and so on that perform particular tasks or implement particular abstract data types. Computer system/server 212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 212 in data processing system 210 is shown in the form of a general-purpose computing device. The components of computer system/server 212 may include, but are not limited to, one or more processors or processing units 216, a system memory 228, and a bus 218 that couples various system components including system memory 228 to processor 216. Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 212 typically includes a variety of computer system readable media. Such media may be any available media that is accessible by computer system/server 212, and it includes both volatile and non-volatile media, removable and non-removable media.

System memory 228 can include computer system readable media in the form of volatile memory, such as random access memory (RAM) 230 and/or cache memory 232, and/or non-volatile memory such as read-only memory (ROM). Computer system/server 212 may further include other removable/non-removable, volatile/non-volatile computer system storage media. By way of example only, storage system 234 can be provided for reading from and writing to at least one non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data.

Each of the operating system, one or more application programs, other program modules, and program data or some combination thereof, may include an implementation of a networking environment.

Program modules 242 generally carry out the functions and/or methodologies of embodiments of the invention as described herein.

Computer system/server 212 may also communicate with one or more external devices 214 such as a keyboard, a pointing device, a display 224, etc.; one or more devices that enable a user to interact with computer system/server 212; and/or any devices (e.g., network card, modem, etc.) that enable computer system/server 212 to communicate with one or more other computing devices. Such communication can occur via Input/Output (I/O) interfaces 222. Still yet, computer system/server 212 can communicate with one or more networks such as a local area network (LAN), a general wide area network (WAN), and/or a public network (e.g., the Internet) via network adapter 220. As depicted, network adapter 220 communicates with the other components of computer system/server 212 via bus 218. It should be understood that although not shown, other hardware and/or software components could be used in conjunction with computer system/server 212. Examples, include, but are not limited to: microcode, device drivers, redundant processing units, external disk drive arrays, RAID systems, tape drives, and data archival storage systems, etc.

Thus, the data processing system 210 comprises the at least one processor 216, the memory (RAM 230 or ROM—not shown) coupled to the at least one processor, and at least one computer readable hardware storage device 234 coupled to the at least one processor 216, wherein the at least one storage device 234 contains program code which, upon being executed by the at least one processor 216 via the memory, implements the methods of the present invention.

A computer program product of the present invention comprises at least one computer hardware readable storage device 234 containing program code which, upon being executed by least one processor 216 of the data processing system 210, implements the methods of the present invention.

The block diagrams in the figures illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified logical functions. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams, and combinations of blocks in the block diagrams, can be implemented by special purpose hardware-based systems that perform the specified functions or acts, or combinations of special purpose hardware and computer instructions.

Figure 7:
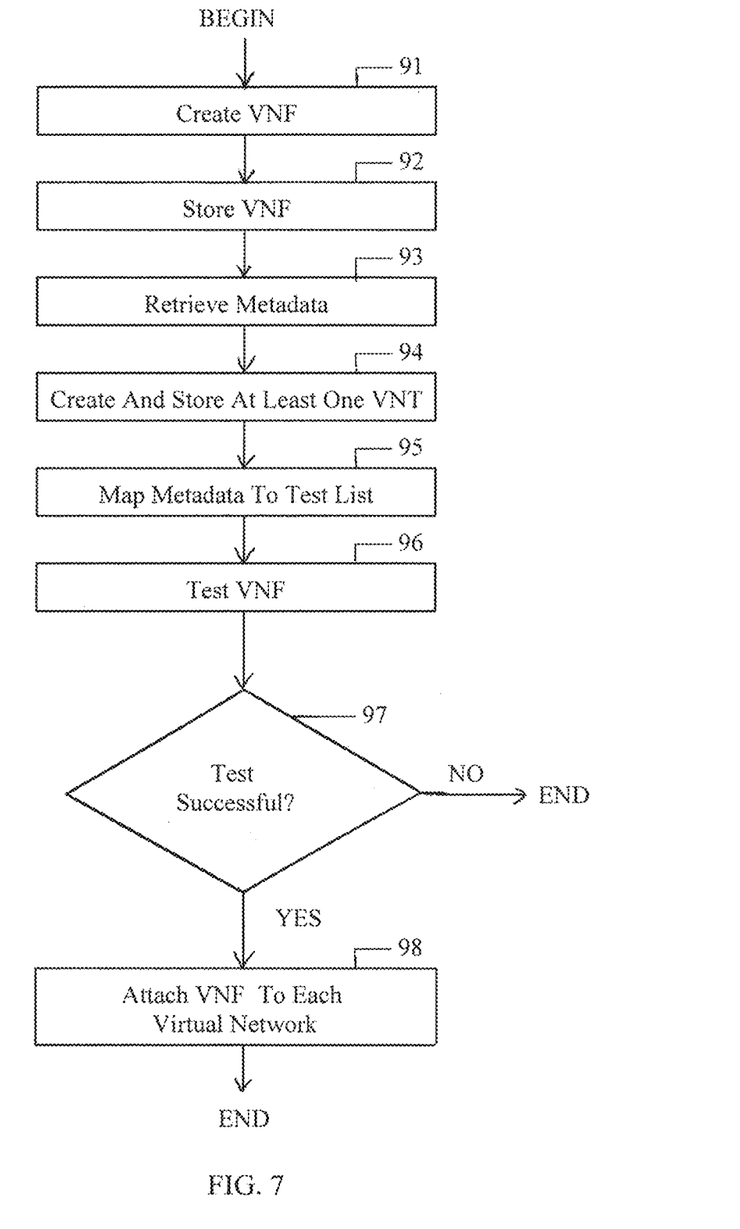
FIG. 7 is a flow chart of a for testing a Virtualized Network Function in a network according to the invention.

FIG. 7 is a flow chart of a method for testing a function in a network according to the invention. The network may be the service provider network (12) in one embodiment. The flow chart of FIG. 7 includes steps 91-98.

Step 91 creates or changes a Virtualized Network Function (VNF) (10) that is configured for deployment in the network.

Step 92 stores the VNF in the network.

Step 93 retrieves metadata comprising test parameters pertaining to a network environment specific to the VNF stored in the network.

Step 94 creates at least one Virtualized Network Tester (VNT) (16) for testing the VNF and stores the at least one VNT in the network.

In response to creating the at least one VNT, step 95 maps the metadata to a test list to define a test suite of test cases in the test list, said test cases based on the test parameters in the metadata.

Step 96 tests the VNF by the at least one VNT in accordance with the test suite to enable the at least one VST to emulate the network environment specific to the VNF, wherein the VNF is disconnected from the network and from a plurality of virtual networks (52, 54) in the network during the testing of the VNF; and Step 97 determines whether the testing of the VNF is successful.

If the testing of the VNF is successful (YES branch from step 97), step 98 attaches the VNF to the network and to each virtual network of the plurality of virtual networks to enable the VNF to be deployed in the network.

If the testing of the VNF is not successful (NO branch from step 97), then the method ends.

In one embodiment, the VNF and the at least one VNT are stored in a compute node (50) of the network.

In one embodiment, the method comprises: creating the VNF that is configured for deployment in the network; and before retrieving the metadata, storing the created VNF in the network.

In one embodiment, the method comprises: changing the VNF that is configured for deployment in the network; and before retrieving the metadata, storing the changed VNF in the network.

In one embodiment, the method comprises determining that the VNF is deployed in the network but has not yet been tested and in response, performing said creating the VNT, said mapping the metadata, and said testing the VNF by the at least one VNT:

In one embodiment, each VNT of the at least one VNT is a virtual machine.

In one embodiment, the method comprises accessing, by the VNT, traffic patterns specific to the VNF, wherein said testing the VNF by the at least one VNT comprises utilizing the accessed traffic patterns specific to the VNF.

In one embodiment, testing the VNF by the at least one VNT comprises testing the VNF by the VST in a Network function Virtualization and/or Software Defined Networking enabled network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, application specific integrated circuit (ASIC), field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for testing a function in a network, said method comprising:
   retrieving, by one or more processors of a data processing system, metadata comprising test parameters pertaining to a network environment specific to a Virtualized Network Function (VNF) stored in the network;
   said one or more processors (i) creating at least one Virtualized Network Tester (VNT) for testing the VNF and (ii) storing the at least one VNT in the network;
   in response to said creating the at least one VNT, said one or more processors mapping the metadata to a test list to define a test suite of test cases in the test list, said test cases based on the test parameters in the metadata;
   said one or more processors testing the VNF by the at least one VNT in accordance with the test suite to enable the at least one VNT to emulate the network environment specific to the VNF, said VNF being disconnected from a plurality of virtual networks in the network during said testing; and
   said one or more processors determining that said testing is successful and in response, attaching the VNF to each virtual network of the plurality of virtual networks to enable the VNF to be deployed in the network.

2. The method of claim 1, wherein the VNF and the at least one VNT are stored in a compute node of the network.

3. The method of claim 1, said method further comprising:
   said one or more processors creating the VNF; and
   before said retrieving the metadata, said one or more processors storing the created VNF in the network.

4. The method of claim 1, said method further comprising:
   said one or more processors changing the VNF; and
   before said retrieving the metadata, said one or more processors storing the changed VNF in the network.

5. The method of claim 1, said method comprising:
   said one or more processors determining that the VNF is deployed in the network but the VNT has not yet been tested and, in response, said one or more processors performing said creating the VNT, said mapping the metadata, and said testing the VNF by the at least one VNT.

6. The method of claim 1, said method comprising:
   said one or more processors accessing, by the VNT, traffic patterns specific to the VNF, wherein said testing the VNF by the at least one VNT comprises utilizing the accessed traffic patterns specific to the VNF.

7. The method of claim 1, wherein each VNT of the at least one VNT is a virtual machine.

8. The method of claim 1, wherein testing the VNF by the at least one VNT comprises testing the VNF by the VST in a Network function Virtualization, in a Software Defined Networking enabled network, or in both the Network function Virtualization and the Software Defined Networking enabled network.

9. A data processing system comprising at least one processor, a memory coupled to the at least one processor, and at least one computer readable hardware storage device coupled to the at least one processor, said at least one storage device containing program code which, upon being executed by the at least one processor via the memory, implements a method for testing a function in a network, said at least one processor and said memory being hardware, said method comprising:
   retrieving, by one or more processors of a data processing system, metadata comprising test parameters pertaining to a network environment specific to a Virtualized Network Function (VNF) stored in the network stored in the network;
   said one or more processors (i) creating at least one Virtualized Network Tester (VNT) for testing the VNF and (ii) storing the at least one VNT in the network;
   in response to said creating the at least one VNT, said one or more processors mapping the metadata to a test list to define a test suite of test cases in the test list, said test cases based on the test parameters in the metadata;
   said one or more processors testing the VNF by the at least one VNT in accordance with the test suite to enable the at least one VNT to emulate the network environment specific to the VNF, said VNF being disconnected from a plurality of virtual networks in the network during said testing; and
   said one or more processors determining that said testing is successful and in response, attaching the VNF to each virtual network of the plurality of virtual networks to enable the VNF to be deployed in the network.

10. The data processing system of claim 9, wherein the VNF and the at least one VNT are stored in a compute node of the network.

11. The data processing system of claim 9, said method further comprising:
    said one or more processors creating the VNF; and
    before said retrieving the metadata, said one or more processors storing the created VNF in the network.

12. The data processing system of claim 9, said method further comprising:
    said one or more processors changing the VNF; and
    before said retrieving the metadata, said one or more processors storing the changed VNF in the network.

13. The data processing system of claim 9, said method comprising:
said one or more processors determining that the VNF is deployed in the network but the VNT has not yet been tested and in response, said one or more processors performing said creating the VNT, said mapping the metadata, and said testing the VNF by the at least one VNT.

14. The data processing system of claim 9, said method comprising:
said one or more processors accessing, by the VNT, traffic patterns specific to the VNF, wherein said testing the VNF by the at least one VNT comprises utilizing the accessed traffic patterns specific to the VNF.

15. A computer program product, comprising at least one computer readable hardware storage device containing program code which, upon being executed by least one processor of a data processing system, implement a method for testing a function in a network, said method comprising:
retrieving, by one or more processors of a data processing system, metadata comprising test parameters pertaining to a network environment specific to a Virtualized Network Function (VNF) stored in the network stored in the network;
said one or more processors (i) creating at least one Virtualized Network Tester (VNT) for testing the VNF and (ii) storing the at least one VNT in the network;
in response to said creating the at least one VNT, said one or more processors mapping the metadata to a test list to define a test suite of test cases in the test list, said test cases based on the test parameters in the metadata;
said one or more processors testing the VNF by the at least one VNT in accordance with the test suite to enable the at least one VNT to emulate the network environment specific to the VNF, said VNF being disconnected from a plurality of virtual networks in the network during said testing; and
said one or more processors determining that said testing is successful and, in response, attaching the VNF to each virtual network of the plurality of virtual networks to enable the VNF to be deployed in the network.

16. The computer program product of claim 15, wherein the VNF and the at least one VNT are stored in a compute node of the network.

17. The computer program product of claim 15, said method further comprising:
said one or more processors creating the VNF that is configured for deployment in the network; and
before said retrieving the metadata, said one or more processors storing the created VNF in the network.

18. The computer program product of claim 15, said method further comprising:
said one or more processors changing the VNF that is configured for deployment in the network; and
before said retrieving the metadata, said one or more processors storing the changed VNF in the network.

19. The computer program product of claim 15, said method comprising:
said one or more processors determining that the VNF is deployed in the network but the VNT has not yet been tested and in response, said one or more processors performing said creating the VNT, said mapping the metadata, and said testing the VNF by the at least one VNT.

20. The computer program product of claim 15, said method comprising:
said one or more processors accessing, by the VNT, traffic patterns specific to the VNF, wherein said testing the VNF by the at least one VNT comprises utilizing the accessed traffic patterns specific to the VNF.

* * * * *